March 24, 1970
P. COMMENT
3,502,296
FORM FOR CONSTRUCTING BUILDINGS
Filed March 2, 1967
7 Sheets-Sheet 1
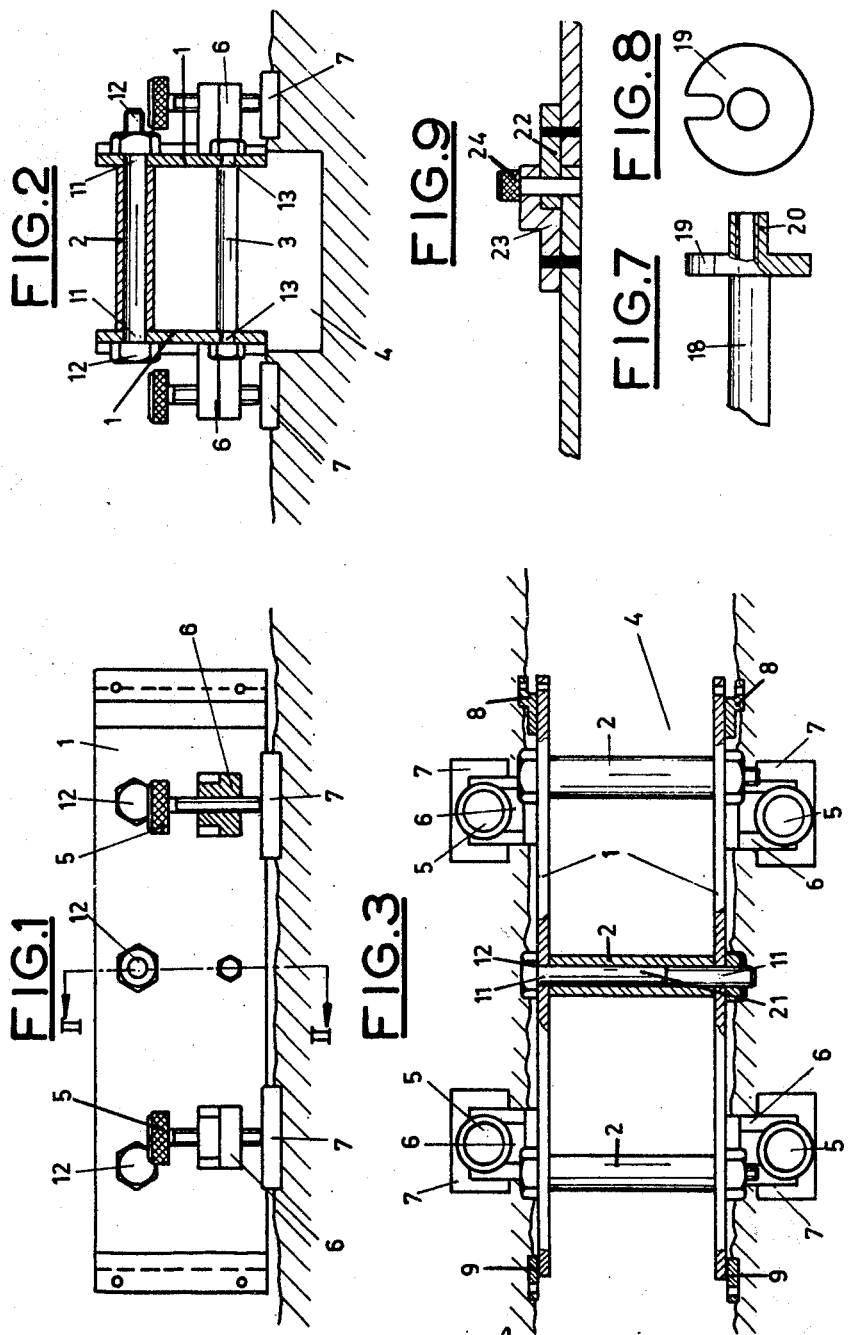

March 24, 1970 P. COMMENT 3,502,296
FORM FOR CONSTRUCTING BUILDINGS
Filed March 2, 1967 7 Sheets-Sheet 2
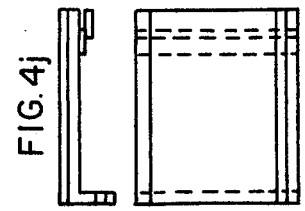
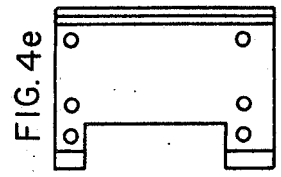
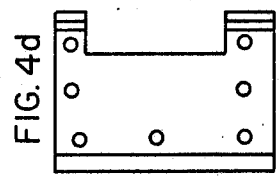
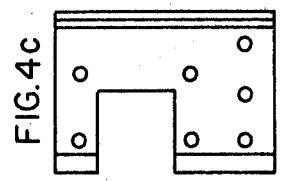
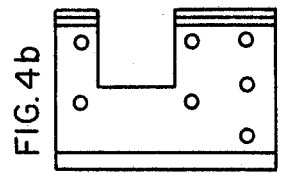
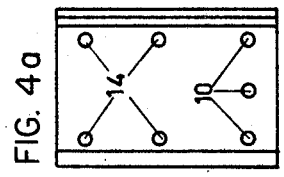
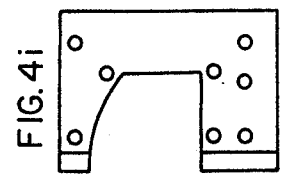
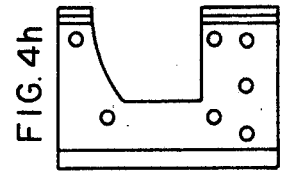
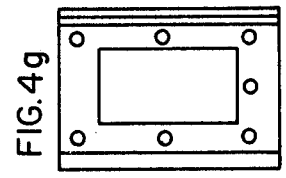
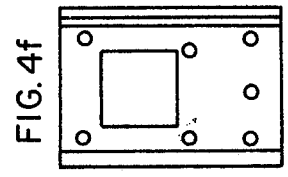
Inventor:
Paul Comment
By Robert E. Burns
Atty.

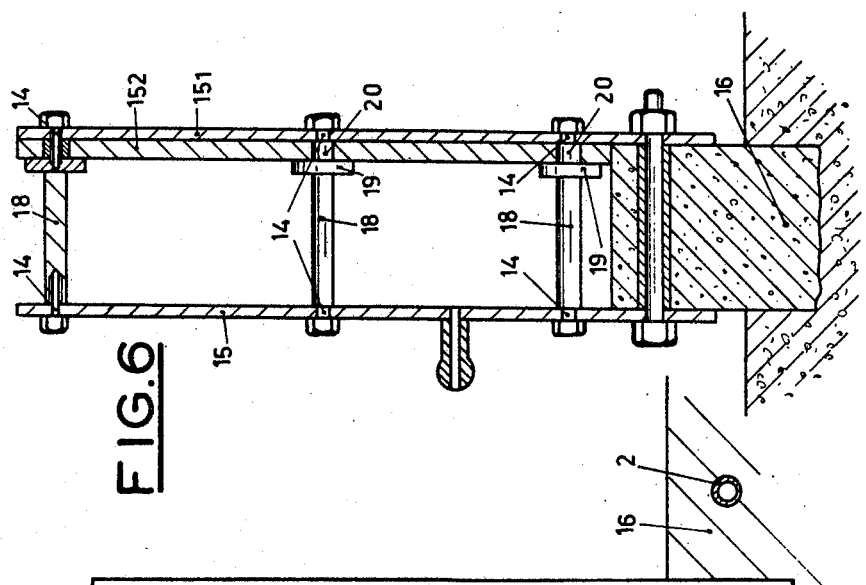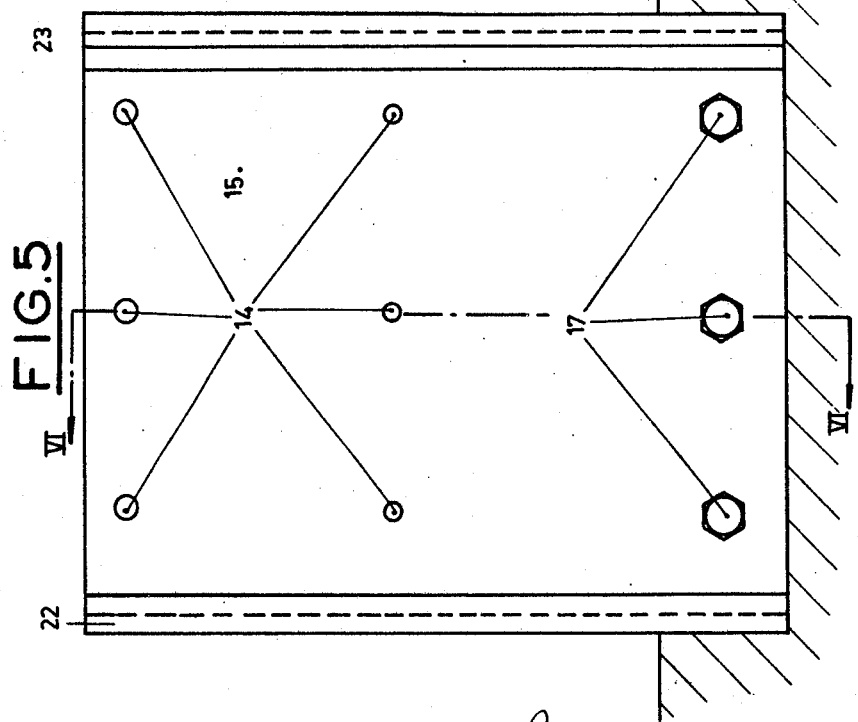

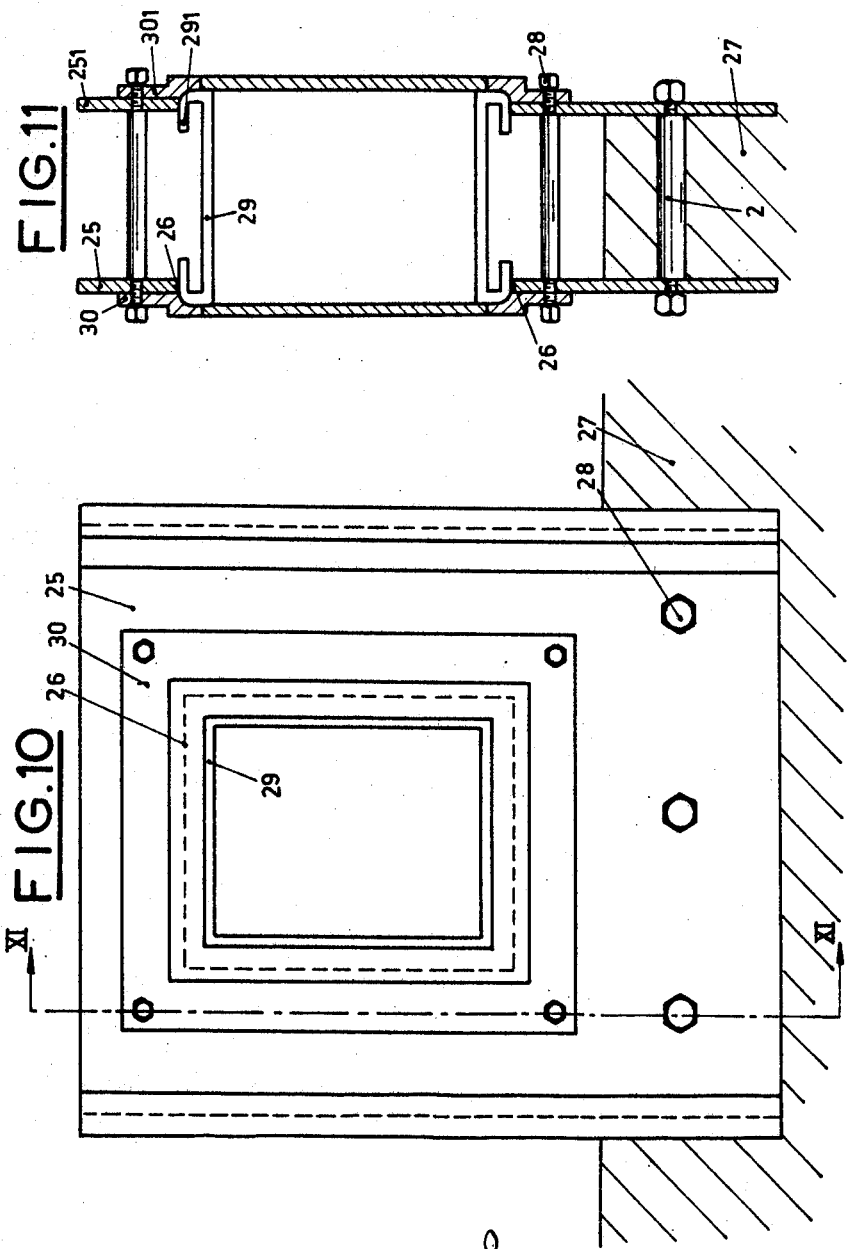

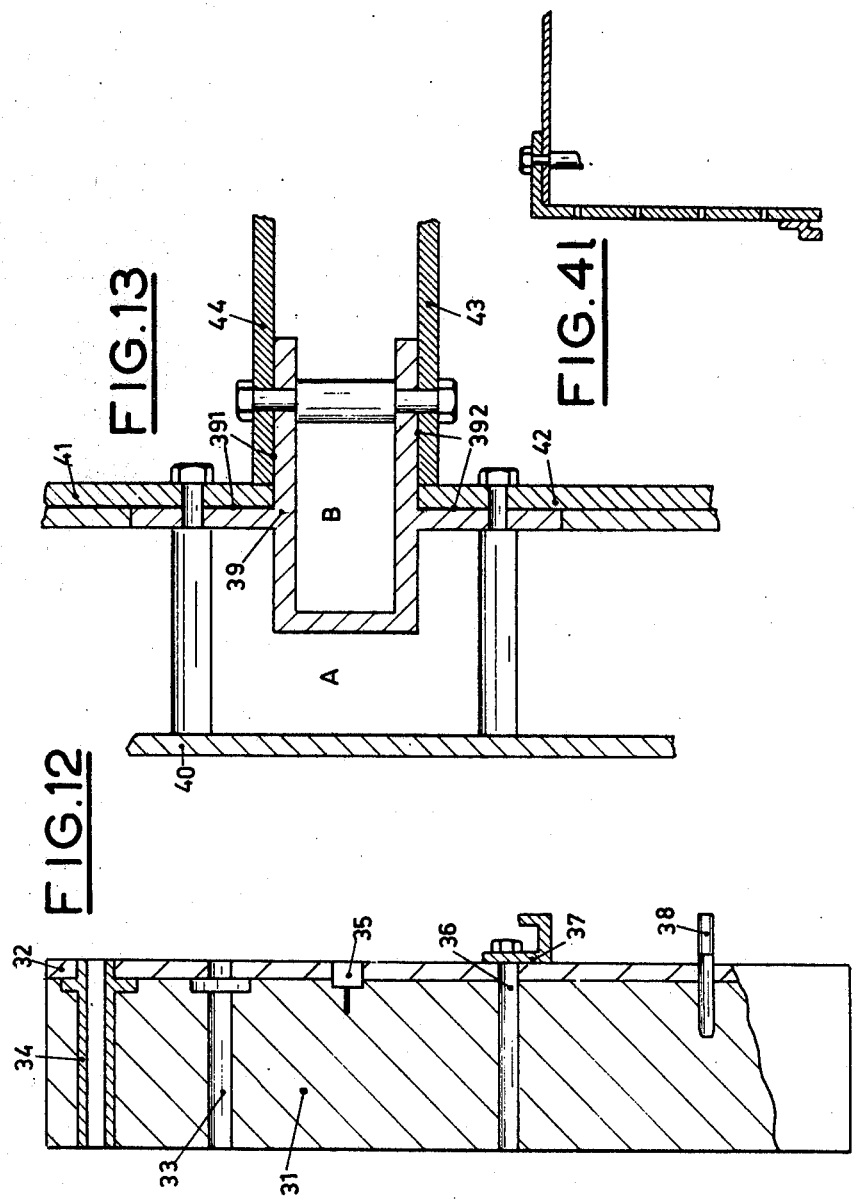

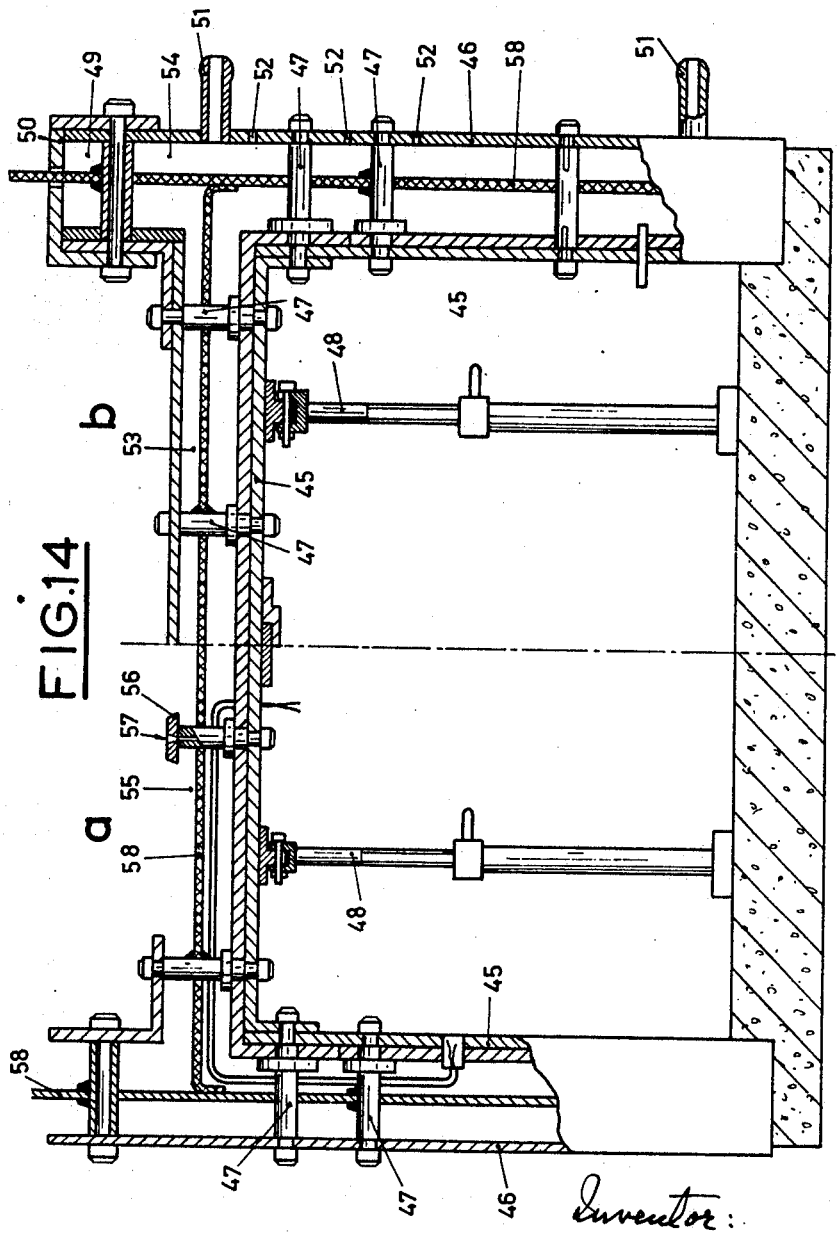

March 24, 1970 P. COMMENT 3,502,296
FORM FOR CONSTRUCTING BUILDINGS
Filed March 2, 1967 7 Sheets-Sheet 7

Inventor:
Paul Comment
By Robert E. Burns
Atty.

United States Patent Office 3,502,296
Patented Mar. 24, 1970

3,502,296
FORM FOR CONSTRUCTING BUILDINGS
Paul Comment, 2892 Courgenay, Switzerland
Filed Mar. 2, 1967, Ser. No. 620,181
Claims priority, application Switzerland, Mar. 8, 1966, 3,296/66
Int. Cl. E04g 11/02
U.S. Cl. 249—27　　　　　　　　　　　　　8 Claims

ABSTRACT OF THE DISCLOSURE

Form for the construction of buildings having the shape of a mould in which there can be cast in one shot at least a complete story of the building and made by the assembly of dismountable elements, these elements being standardized and having as a result only a certain determined number of possible shapes and modular shapes, provided in advance and corresponding each to a type of elements or "modules," the assembly of different types of modules forming a set of modules in which there can be selected exclusively the elements going into the making of the form, two identical modules being inter-changeable, there being a distinction between the modules between those intended for making foundations or "modules of foundations" and those intended for making parts of the form intended for moulding the building itself or "modular forms," these different modules having means permitting their assembling to one another and other means for introducing concrete and for permitting the passage or the later placing of auxiliary members. The invention also is concerned wtih means for assembling this form comprising several classes of cloth pieces intended to reciprocally maintain the walls of the form and means permitting the mutual assembly of different modules forming the form. The invention is also concerned with a mode of using this form wherein the modules of the foundation are first assembled, these foundations are cast, the modules of the foundation are withdrawn and there is assembled on these foundations the form intended for moulding the building itself.

---

Already known are processes for making buildings which use metallic forms constituted by sheet metal panels in which the concrete is cast. These forms are disassembled after the concrete has set and then used for another construction.

The assembly of these forms requires skilled workers and an outer armature is needed for originally securing the panels of the form.

It has also been proposed in the construction of buildings to inject a material comprising concrete or similar material in a closed form constituting the mould of at least one complete story of the building and to then remove after hardening of the injected material at least a part of said form.

This process can make possible the fabrication of the house by moulding, in the same way as are moulded metallic or plastic pieces.

Such a process is described in Swiss patent application No. 4,105/65.

If by this process it has been possible to reduce importantly the time necessary for constructing a building or a villa and to proportionally diminish the amount of specialised labour generally necessary for this type of construction, it is possible to still reduce further the elements of cost price and to lower it as a result thereof in appreciable fashion by rendering more efficient the concept in the assembly of such forms.

The present invention aims precisely at such efficiency by an improved standardization in the construction of such forms.

The present invention will be better understood by referring to the accompanying drawing which shows by way of example a particular embodiment of the invention and in which:

FIGURES 1, 2 and 3 show from the side, cross-sectionally along line II—II of FIGURE 1, and above, the mutual assembly of modules of foundation.

FIGURE 4 represents several possible types of modules of forms (4a, 4b, 4c, 4d, 4e, 4f, 4g, 4h, 4i, 4j, 4k), and 4l.

FIGURES 5 and 6 show respectively front views or cross-sectional views along line VI—VI of FIGURE 5, the putting in place of an element of a form such as element 4a shown on FIGURE 4.

Figure 15:
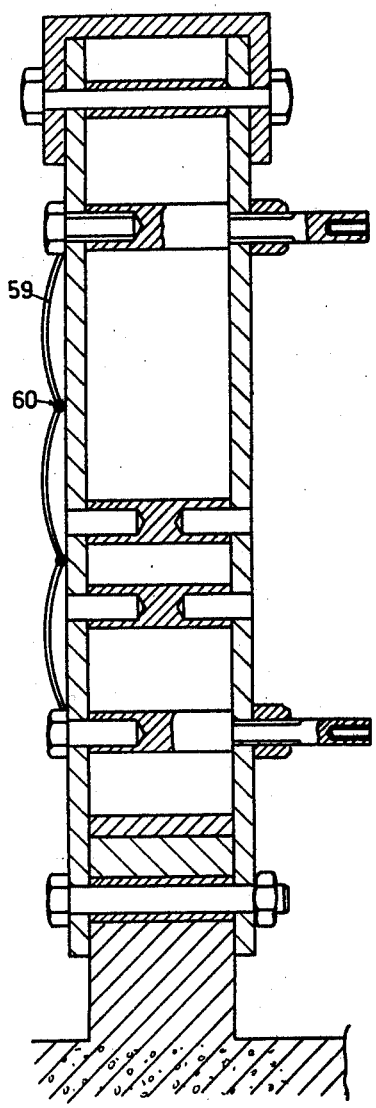

FIGURES 7 and 8 show from the side and the face a cross piece used for putting in place that part of the form, and FIGURE 9 shows means for assembling two consecutive modules of the form, FIGURES 10 and 11 seen from the front and in cross-sectional lines XI—XI of FIGURE 10 of a form model such as that shown under letter b of FIGURE 4, FIGURE 12 shows in cross-section a wall such as it appears when it is separated from the mould, FIGURE 13 shows a part of the form intended for linking two perpendicular walls, FIGURE 14 is a cross-sectional view of the assembled form for making a hall. While part (a) of this figure shows its mode of use by casting, part (b) shows the form such as it is when the concrete is introduced by pressure injection, FIGURE 15 shows a detail of a form assembled before introduction of the concrete, and FIGURE 16, the wall obtained by means of the form shown on FIGURE 15.

Referring first to FIGURES 1, 2 and 3, the modules are shown which are adapted to receive in the lower part thereof the upper part of a foundation wall shown in greater detail in FIGURE 14, consist of elements in the shape of rectangular plaques 1 the height of which is relatively small with respect to the width. These foundation modules have first an opening 11 intended for the passage of bolts 12 which maintain between these modules tubes 2 which will later be embedded in the concrete of the foundation which will permit the securing thereon of the base of the form for the building itself, thanks to the opening 21 which these will provide in the concrete after hardening thereof.

These modules will have furthermore openings 13 intended for the passage of both maintaining cross bar ties 3 which ensure the suitable spacing of these modules. The latter are disposed thus assembled above the section of the foundation and mounted vertically by previous adjustment of the screws for levelling modules 5 rigid with these modules by means of ears 6 in which are vertically screwed said screws and which bear agains stops 7 provided on both sides of section 4.

The foundation modules are assembled laterally by means of legs 8 and 9 cooperating mutually by means of keys or other securing means as shown on FIGURE 9.

There is seen on 4a a form module filled up and intended for a zone without openings. At 4b and 4c are shown two modules each showing a part of the cut-out for a window. These two modules can be either directly assembled laterally for windows of medium width or, in order to make bay windows, they can be separated by as many intermediate upper and lower modules as necessary. These intermediate modules haven't been shown but can easily be conceived as serving to prolong the distance existing between modules 4b and 4c located at the two extremities of the window.

Modules 4d and 4e show complementary modules for doors each one of the modules having a part of the cutout which when assembled form doors.

What has just been said about windows can also be said for doors and it is also possible to assemble laterally directly modules 4d and 4e to make an opening for a narrow door or on the contrary it is possible to position between module 4d and 4e a predetermined number of upper and lower portions of modules not shown and that can easily be imagined to be similar to those which have been indicated for bay windows.

In this manner it is possible to make doors having a variable width and even for example garage doors which are very wide.

The module shown by letter 4b is a module intended for a simple window while the module shown under letter g shows a module for a door.

Additional modules shown by letter 4h and 4i are for example provided to make the arch of a dining room or a window the upper part of which is curved or still an opening for an oven.

The modules shown respectively under letter 4j and 4k are modules intended for forming slabs.

Finally FIGURE 4l shows a square module for the angles of the building.

It will be noted that the different modules (4a, 4b, 4c, 4d, 4e, 4f, 4g, 4h and 4i) have the same overall dimensions and accordingly are interchangeable.

It has already been indicated that the preceding enumeration of modules is in no way limiting and that there may be added a large number of other modules for example for staircases, elevator shafts, balconys etc.

The different modules carry invariably on their base a certain number of perforations 10 which permit to secure these modules either on the foundations themselves to make the first floor of the building or on the upper part of the concrete of the previously finished story.

These modules moreover have openings 14 intended for positioning cross bars to maintain the shape of the form.

The disposition of one of these forming modules, for example the module shown in FIGURE 4a, is described in detail on FIGURES 5 and 6.

On these, module 15 is secured by bolts 17 on the wall of the foundation 16 by means of tubes 2 previously embedded in the wall during its fabrication.

Bolts 17 use the orifices 10 previously described.

Modules 15 have as this has already been indicated openings 14 which permit the placing of cross bars 18.

These cross bars described on FIGURES 7 and 8 have the shape of a cylindrical sleeve one extremity of which bears a collar 19 shown in the front view of FIGURE 8. This extremity prolongs itself by the insertion of cross bar 20 which permits the positioning on one of the modules 151 of an insulating coating 152 which will remain integral with the concrete when the form has been withdrawn.

The side parts of these modules have securing means for hooking one to another and which consist on one side of a welded band forming a flange 22 and on the other side a bayonet shape elbow flange, welded at 23. The assembly of parts 22 and 23 is represented on FIGURE 9 in which the pins 24 or the cross bars assemble laterally the modules of successive forms.

It has already been indicated that it is also possible to provide this mode of lateral fixation for assembling vertically several modes forming modules.

On FIGURE 10 is shown in detail the assembly of forming modules such as described in FIGURE 4f and which is intended for making a window.

Module 25 has a rectangular opening 26. However it is conceived that during casting of the concrete and in order that the opening of the window might be preserved, it will be necessary to mount a lateral frame in the dimensions of the window. For this purpose the mounting of the modules of the window is effected in the following way.

One begins by placing face to face modules 25 and 251 respectively which are mounted on their base either on the foundation walls or on the upper part of the periphery of the concrete forming the story previously finished 27 to which they are maintained by bolts 28 passing through tubes 2 of which there has been mention made previously on FIGURES 1, 2 and 3.

There is then mounted fitting in openings 26 in front of corresponding modules 25 and 251 a frame 29 which has the exact inner measurements of the window and has edges 291 which permit it to remain embedded in the concrete after removal of the form.

This frame 29 limits the exact periphery of the window and closes the form at this part at the same time as it forms the base piece of the window.

The frame thus introduced is locked by means of two rectangular plates 30 and 301 which will be withdrawn at the same time as the form.

What has been described for making the opening of a window is naturally applicable for the making of doors or of different openings in the building and this will be repeated for the putting into action of forming modules described on FIGURES 4b, c, d, e, g, h, and i.

Moreover although this has not been shown in the drawing it is understood that as has been represented on FIGURE 3 for a full module, it is possible to line one of the forming modules (for example module 251) with an insulating coating intended to be rigid with the concrete after removal of the mould.

FIGURE 12 shows the cross-section of a wall as it appears after removing of the form.

Wall 31 has on one of its surfaces an insulating coating 32 just mentioned. It also has embedded in its mass cross bars 33 and at its upper part tubes 34 which permit to secure the forming modules intended for moulding a higher floor.

Different members can be disposed on the forming modules so as to be embedded and set with the concrete of the wall.

There can be for example boxes for the electric switches 35, bars or cross pieces 36 one extremity of which will bear after removal of the mould a support 37 for the water, gas conduits or for cables.

Finally this can be heating pipes 38 maintained by the form and embedded in the concrete.

It will be noted that the insulating coating will necessarily be constituted of a very porous material which will permit a ready adherence to the concrete.

FIGURE 13 shows a part of a form intended for linking two particular walls or one wall and a slab of the floor.

The purpose of this assembling is to principally provide, while casting the concrete, an insulating element 39. This element can provide a thermal insulation as well as a mechanical and acoustical insulating between the two assembled elements.

While there is assembled as previously described forming elements 40, 41, 42, 43 and 44, there is disposed before moulding insulating element 39 inside the form. This element will consist generally of a relatively supple material such as plastic, cork or other materials having certain properties of thermal, acoustical or mechanical insulating. This element 39 will remain embedded in the concrete after removal of the form and will separate wall A from the other wall or from slab B.

It should be understood that element B can either be a wall or the separating slab between two storys and that faces 391 and 392 will remain visible after removal of the form. Owing to this fact it is possible to provide a different colour in the final coating of wall A and of the wall or of the story separating slab B, mainly on the side of the wall.

FIGURE 14 shows in cross-section the form assembled for making an entire room.

The inner part of the form made by assembling form module 45 integrated with external forming module 46 by cross pieces 47 is supported by jacks 48.

The right hand half of FIGURE 14 shows the form such as it is when the concrete is moulded by pressure injection. In this case the mould must be completely closed and the top of the upper story 49 is closed by a cover 50. Concrete is introduced by upper and lower inlets 51 mounted on certain outer forming modules and orifices for removing air 52 are provided between the upper and lower inlets.

In order to simplify the drawing, the insulating element separating slab 53 from the finished wall 54 of which mention has been made before has not been shown but it is understood that it can be there.

The form having been withdrawn, slab 53 in which are embedded cross bars will form a cope on which can be disposed the flooring of the first floor.

On the left hand side of drawing 14 is shown the assembled form such as it is used when the concrete is cast by successive accumulation.

For this, it will be noted that the upper part of form 55 remains open in order to permit the introduction of liquid concrete.

In this respect there should be noted the presence of special cross bars the upper part of which 56 must touch the surface of the cope formed by the casting of concrete in the upper part of the form and which has a rectilinear hollow 57 permitting to dispose on two neighboring cross bars of this type, a slide the upper part of which also touches the surface of this cope, two parallel slides of this type being disposed at a distance and permitting to the worker to make slide thereon a guide bar permitting to level the upper part of the slab and to ensure the perfect flatness thereof.

It should be noted that there can be disposed inside the form which has just been described and before casting the concrete a central metallic armature 58 constituted for example of scrap iron having a circular cross section or other and that the different elements such as electrical conduits of water or gas or central heating conduits can be priorly provided in order to be embedded in the concrete at the moment the same is cast.

FIGURE 15 shows in detail a forming element such as previously described. There will be noted in particular the possibilities of reinforcing the forming modules by the disposition of sheets of iron 59 having reinforcing ribs 60 or other reinforcing means.

Figure 16:
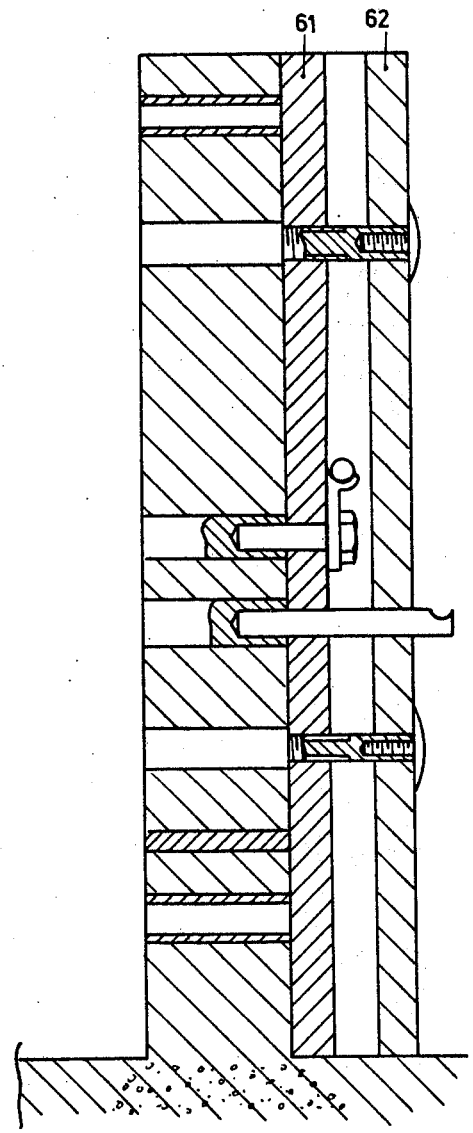

FIGURE 16 shows a wall obtained after injecting the concrete and removing the form.

The finished inside wall 62 of the room can be mounted against a first insulating layer 61 which is initially disposed against a forming module and then adheres to the concrete. In this way various otherwise unattractive appliances can be hidden between elements 61 and 62.

It should be noted that with respect to the insulating coating initially secured to the forming modules that is advantageous to shift their side with respect to the side itself of the module in such a way that the linking lines will not come in front of the linking lines of the modules Finally it is indicated that the insulting coating will be generally provided on the forming modules disposed inside the building but that this coating can be placed in the form itself and maintained by two shoulders or cross bars and that furthermore that the forming modules intended for the outside of the building can be covered by a plastic coating the surface of which will have the designs that are desired on the concrete after removing the form. This plastic coating naturally will remain integral with the forming modules and will be removed therewith when the forms are removed.

It will be understood that while the present description has referred to the use of concrete for the making of buildings, it is obvious that other cementitious materials can similarly be used. Furthermore the listing of the various fixtures which may be attached to the modules of the invention is by no means exhaustive.

What is claimed is:

1. A form for the making of buildings consisting essentially of a mould in which can be cast in one shot at least one entire floor of the building from cementitious material, said mould comprising an assembly of modules of a height substantially equal to a story, each module consisting of a group of walled, dismountable and laterally connected inner and outer elements having a standard shape and modular dimensions, at least some of said elements having standard, framed openings adapted to cooperate by lateral assembly of element to element to constitute apertures for doors or windows in a finished structure, inlet openings extending axially into said outer elements and positioned above and below said standard opening for introducing said cementitious material between said inner and outer elements; air evacuating orifices intermediate said elements; means for assembling parts together and means for removably assembling said modules to one another.

2. Form according to claim 1, wherein at least some of said elements are coated with insulating plates.

3. Form according to claim 1, having supporting means securing said frames of said elements thereby defining said standard openings.

4. Form according to claim 1, having therein an armature positioned intermediate at least some of said elements.

5. Form according to claim 1, wherein openings are provided in at least some of said modules for permitting the passage therein of gas, water, or central heating conduits or of electric cables.

6. Form according to claim 5, having channels wherein said conduits are positioned before casting said cementitious material in order to be embedded therein after said form is removed.

7. Form according to claim 1, wherein insulating material is provided therein in order to mechanically, acoustically or thermally insulate the inner walls of the resulting building and slabs separating the floors of said building from the outer walls of said building.

8. Form according to claim 1, wherein the lowermost of said dismountable elements is of open structure so as to receive therein the upper part of a foundation wall.

References Cited

UNITED STATES PATENTS

| 1,271,262 | 7/1918 | Bachman | 249—26 X |
| 1,646,096 | 10/1927 | Liptak | 249—97 |
| 2,017,553 | 10/1935 | Troiel | 249—26 X |
| 2,296,553 | 9/1942 | Heritage et al. | 249—114 X |
| 2,893,235 | 7/1959 | Goldberg | 249—39 X |
| 3,367,618 | 2/1968 | Masur | 249—39 |
| 2,903,877 | 9/1959 | Meade | 264—35 X |
| 3,182,374 | 5/1965 | Cook. | |

FOREIGN PATENTS 435,089   2/1965   France.

J. SPENCER OVERHOLSER, Primary Examiner

D. W. JONES, Assistant Examiner

U.S. Cl. X.R.

264—31